United States Patent
Rivas

(10) Patent No.: US 10,161,378 B2
(45) Date of Patent: Dec. 25, 2018

(54) ENERGY RECOVERING EQUIPMENT AS WELL AS A METHOD FOR RECOVERING ENERGY

(71) Applicant: Sulzer Pumpen AG, Winterthur (CH)

(72) Inventor: Miguel Angel Rivas, Madrid (ES)

(73) Assignee: Sulzer Management AG, Winterthur (CH)

( * ) Notice: Subject to any disclaimer, the term of this patent is extended or adjusted under 35 U.S.C. 154(b) by 0 days.

(21) Appl. No.: 14/365,678

(22) PCT Filed: Nov. 28, 2012

(86) PCT No.: PCT/EP2012/073848
§ 371 (c)(1),
(2) Date: Jun. 16, 2014

(87) PCT Pub. No.: WO2013/092145
PCT Pub. Date: Jun. 27, 2013

(65) Prior Publication Data
US 2015/0001854 A1    Jan. 1, 2015

(30) Foreign Application Priority Data

Dec. 20, 2011    (EP) .................................... 11194651

(51) Int. Cl.
*F03B 13/06*    (2006.01)
*F03G 6/02*    (2006.01)
(Continued)

(52) U.S. Cl.
CPC .............. *F03B 13/06* (2013.01); *F01B 23/10* (2013.01); *F03G 6/02* (2013.01); *F03G 6/06* (2013.01); *Y02E 10/46* (2013.01); *Y02E 60/17* (2013.01)

(58) Field of Classification Search
CPC .... F03G 6/06; F03G 6/02; F03B 13/06; F03B 17/04; F03B 17/005; F01B 23/10; Y02E 10/46
See application file for complete search history.

(56) References Cited

U.S. PATENT DOCUMENTS 1,871,244 A * 8/1932 Steuart ............................ 165/62
4,400,946 A * 8/1983 Oplatka .................. F03G 6/065
60/641.8
(Continued)

FOREIGN PATENT DOCUMENTS

DE    102010023843 A1    1/2011
EP         0127166 A2    12/1984
(Continued)

OTHER PUBLICATIONS

International Search Report and Written Opinion dated Mar. 15, 2013, from PCT Application No. PCT/EP2012/073848 (11 pages).

*Primary Examiner* — Viet Nguyen
(74) *Attorney, Agent, or Firm* — Kilpatrick Townsend & Stockton LLP

(57) ABSTRACT

Disclosed is an energy recovering system having a first pump for pumping a fluid from a first lower level at a first lower potential energy to a second higher level corresponding to a second higher potential energy, and a turbine being located at a third level corresponding to a third potential energy being smaller than said second higher potential energy, wherein the turbine is fluidly connected to the first pump by a connecting pipe such that the fluid can be fed by the first pump via the connecting pipe from the first lower level and via the second higher level to the turbine located at the third level, where the turbine is connected to the first pump in such a way that a recovery-energy recovered from (Continued)

the fluid by passing through the turbine (T) is used for a drive of the concurrently operating first pump.

24 Claims, 3 Drawing Sheets

(51) Int. Cl.
  *F01B 23/10* (2006.01)
  *F03G 6/06* (2006.01)

(56) References Cited

U.S. PATENT DOCUMENTS

| | | | |
|---|---|---|---|
| 4,454,865 A * | 6/1984 | Tammen | 126/640 |
| 4,496,845 A * | 1/1985 | Ensign | F03B 15/12 |
| | | | 290/43 |
| 4,760,705 A * | 8/1988 | Yogev et al. | 60/651 |
| 2004/0088971 A1* | 5/2004 | Mishnayot | 60/398 |
| 2008/0238104 A1* | 10/2008 | Dale | 290/54 |
| 2009/0121481 A1* | 5/2009 | Riley | 290/43 |
| 2011/0204627 A1* | 8/2011 | Ho et al. | 290/43 |
| 2011/0265455 A1* | 11/2011 | Hirota et al. | 60/285 |
| 2011/0304147 A1* | 12/2011 | Ho | 290/54 |
| 2012/0080882 A1* | 4/2012 | Newburn | 290/52 |
| 2012/0132403 A1* | 5/2012 | Rodriguez-Arango et al. | |
| | | | 165/104.25 |
| 2012/0297759 A1* | 11/2012 | Chiu | 60/398 |
| 2014/0125060 A1* | 5/2014 | Sahm | 290/52 |
| 2014/0175804 A1* | 6/2014 | Ou | 290/1 A |

FOREIGN PATENT DOCUMENTS

| | | | |
|---|---|---|---|
| FR | 1090118 A | | 3/1955 |
| WO | WO 2010146202 A1 * | | 12/2010 |

* cited by examiner

ENERGY RECOVERING EQUIPMENT AS WELL AS A METHOD FOR RECOVERING ENERGY

CROSS-REFERENCES TO RELATED APPLICATIONS

This application is a U.S. National Phase of International Application No. PCT/EP2012/073848, filed Nov. 28, 2012, which claims priority to European Patent Application No. 11194651.3, filed Dec. 20, 2011, the disclosures of which are incorporated by reference herein.

BACKGROUND OF THE INVENTION

The invention relates to an energy recovering equipment as well as to a method for recovering an energy by means of an energy recovering equipment in accordance with the preamble of the independent claims.

These days, there are a lot of projects that can help meet the increasing demand for clean, renewable electrical energy and can help reduce reliance on fossil fuels always associated with greenhouse gas emissions. As a result, in particular the importance of solar power is steadily increasing.

Beside a lot of well known techniques for changing solar power into electric energy, there are solutions proposed that use a concentrating solar power technology, wherein the used equipments have an integral storage system for storing or buffering the collected solar power in form of thermal energy. The aforementioned technology generates power from sunlight by focusing the light energy of the sunlight from a field of sun-tracking mirrors, also called "heliostats", onto a central light or radiation receiver, which is installed on a respective central tower. Because of its high melting point, its relatively high heat capacity and its highly efficient heat transfer properties, liquid salt, which flows similar to water when melted, is circulated through the receiver, collecting the energy gathered from the sun. The heated salt is then fed to a heat insulated storage tank where it can be stored for a considerable period of time with minimal energy losses. When electricity is needed and, thus, to be generated, the hot melted salt is routed from the storage tank to a heat exchanger to produce steam being used to generate electricity using a conventional steam turbine equipment. The still liquid but considerable cooled salt is then sent to the cold salt storage tank back, ready to be reused and reheated by the sun in an other new solar energy gathering cycle.

The advantages of the aforementioned technology are obvious. It stores solar energy for use on demand and establishes a stable electricity supply reducing grid reliability impacts from other intermittent renewable energy sources. What is more, if needed, the stored energy in the molten salt can be used to produce electricity even when there is no sunlight. This is particularly beneficial for places where peak electricity demand can continue after the sun goes down and other solar resources can no longer operate, for example solar energy sources such as conventional photovoltaic cells. In addition, the liquid salt provides a cost-effective way to store the solar energy due to its highly efficient heat transfer properties. No natural gas, oil, wood or other fuels are involved in this energy producing process and, as a result, associated combustion emissions to maintain operating stability as some other solar technologies do, can be completely avoided.

However, a still unsolved serious problem is the relatively high power consumption of the pumping system that is used for pumping the liquid salt through the receiver cycle, in particular for pumping the relatively cold liquid salt up to the receiver which is located onto the receiver tower, for example about 200 m high.

BRIEF SUMMARY OF THE INVENTION

It is therefore an object of the invention to provide an improved equipment including a pumping system, in particular, but not restricted to, for use in a solar power plant, having a significantly reduced power consumption compared to the systems in the state of the art.

The subject matter of the invention satisfying this object is characterized by the features of the independent claims.

The dependent claims relate to particularly advantageous embodiments of the invention.

The invention thus relates to an energy recovering equipment, comprising a first pump for pumping a fluid from a first lower level corresponding to a first lower potential energy to a second higher level corresponding to a second higher potential energy, as well as a turbine being located at a third level corresponding to a third potential energy being smaller than said second higher potential energy. Thereby, the turbine is fluidly connected to the first pump by a connecting pipe in such a way that, in the operating state, the fluid can be fed by the first pump via the connecting pipe from the first lower level and via the second higher level to the turbine located at the third level. According to the invention, the turbine is connected to the first pump in such a way that a recovery-energy recovered from the fluid by passing through the turbine is used for a drive of the concurrently operating first pump.

It is thus crucial for the invention that the recovery-energy recovered from the fluid by passing through the turbine is directly used for the drive of the concurrently with the turbine operating first pump. That means, the recovery-energy recovered by the turbine is directly provided to the concurrently working first pump for pumping the fluid up to the second higher level. In other words, the energy which must be provided by the first pump to compensate the potential energy being gained by the fluid when pumping it up to the second level is, at least partly, recovered by the turbine and can be used again for driving the first pump. As a result, essentially only energy losses involved in the pumping process as such, for example losses due to friction processes, hydraulic losses and so on must be compensated by providing additional energy from energy sources outside of the energy recovering system. The potential energy which must be provided to pump the fluid from the first level to the second level can be nearly completely recovered by using an energy recovering system in accordance with the present invention.

It should be noted that the present invention must not be mixed up with well known storage facilities, for example a pumped-storage hydropower plant. A pumped-storage hydropower plant is completely different from the present invention, although it also includes a first pump for pumping a fluid to a higher level and a turbine to recover the potential energy from the fluid which was stored on the higher level. The crucial difference is that, regarding the present invention, the turbine is connected to the first pump in such a way that a recovery-energy recovered from the fluid by passing through the turbine is used for a drive of the concurrently operating first pump. That means, the first pump is directly energized by the concurrently working turbine. In other words, the first pump and the turbine according to the present invention are energetically connected to work together at the same time. That is completely different from how a pumped-storage hydropower plant is operated. Since a pumped-storage hydropower plant is used to store a surplus of electrical energy which is already available from a national grid, the first pump and the turbine of a pumped-storage hydropower plant never work at the same time because the energy recovering process done by the turbine is always done considerably later than the pumping of the fluid up to the higher level.

Regarding a special embodiment of the present invention, the first pump and the turbine are fluidly connected via an energy exchange device being provided at the second higher level for exchanging energy between the fluid and an external energy source, in particular for increasing a thermal energy of the fluid. In practice, the energy exchange device provided at the second higher level will be in most cases a central light or radiation receiver which is installed on a respective central tower, gathering light energy provided by a sun-tracking mirror focussing sunlight onto the energy exchange device which is a sort of radiation receiver.

In particular in order to store the light energy gathered by the energy exchange device in form of a heat energy, a first storage tank and/or a second storage tank for the fluid is provided, what is as such well known from the state in art.

In order to make the light energy gathered by the energy exchange device available for further use, for example in form of a mechanical, an electrical, an heat energy or in form of another developable energy, an energy transforming system is preferably provided in such a way that the fluid can be fed by the first pump located on the first lower level, via the connecting line, via the second higher level, in particular via the energy exchange device being provided at the second higher level, and the turbine to the energy transforming system transforming the energy into an energy being suitable for further use.

In practice, the energy transforming system is preferably an heat exchanger being coupled to an electric power plant for producing and feeding electric energy into an electrical national grid. Regarding another embedment, the energy transforming system can also be for example an heat exchanger being coupled to a long-distance heating power plant for producing and feeding heat energy into an public or local heating national grid.

In particular if a special fluid like oil, molten salt, alcohol or another fluid is used in an energy recovering system in accordance with the invention, a recirculation cycle, preferably a semi-closed or closed recirculation cycle is advantageously established comprising a return pipe provided in such a way that the fluid can be fed by the first pump from the first storage tank located on the first lower level, via the connecting line, via the second higher level, in particular via the energy exchange device being provided at the second higher level, and the turbine back to the first pump. Wherein particularly preferably, the recirculation cycle may comprise the first storage tank, the second storage tank, the return pipe and the energy transforming system in such a way that the fluid can be fed by the first pump located on the first lower level from the first storage tank, via the connecting line, via the second higher level, in particular via the energy exchange device being provided at the second higher level, and the turbine to the second storage tank and via the energy transforming system being connected to the return pipe back to the first storage tank.

Particularly advantageous, to support the first pump, a second pump can be provided, in particular located in the first storage tank and preferably connected in series to the first pump. It is understood, that a power of the second pump may be greater, essentially equal or smaller than a power of the first pump depending on the special embodiment and/or on special demands.

In practice, a third pump can be provided, too, in particular located in the second storage tank and preferably connected to and for feeding the fluid to the energy transforming system.

Regarding a transfer of energy, recovered by the turbine, to the first pump, the turbine can drive an electrical generator producing the electrical recovery-energy being used for the drive of the concurrently operating first pump. With respect to another preferred embodiment of an energy recovering equipment in accordance with the invention, the turbine can also drive an electrical generator producing the electrical recovery-energy which can also be used for an internal grid energizing further electrical components of the energy recovering system, in addition to energizing the drive of the first pump.

Regarding a further embodiment which is very important in practice, the turbine can be mechanically coupled to the first pump providing the mechanical recovery-energy used for the drive of the concurrently operating first pump. Obviously, this embodiment has the important advantage that no additional generator must be provided to feed the recovery-energy from the turbine to the first pump.

In order to ensure a safe and easy control of the pumping power of the pumping system, in particular of the first pump, an output pump-power of the first pump is preferably essentially equal or greater than an output turbine-power of the turbine. Choosing such conditions, the drive of the first pump can easier control the speed. But of course, a self-sufficient solution is also possible where the energy recovered by the turbine and the energy consumed by the first pump are the same.

The present invention also relates to a method for recovering a recovery-energy by means of an energy recovering equipment as described in the present specification. According to the invention, a first pump for pumping a fluid from a first lower level corresponding to a first lower potential energy to a second higher level corresponding to a second higher potential energy is provided, as well as a turbine being located at a third level corresponding to a third potential energy being smaller than said second higher potential energy, wherein the turbine is fluidly connected to the first pump by a connecting line and the fluid is fed by the first pump via the connecting line from the first lower level and via the second higher level to the turbine located at the third level. In accordance with the method of the present invention, the turbine is connected to the first pump in such a way that the recovery-energy recovered from the fluid by passing through the turbine is used for a drive of the concurrently operating first pump.

BRIEF DESCRIPTION OF THE DRAWINGS

In the following the invention will be explained in greater detail with reference to the drawings, which show, in schematic illustration.

DETAILED DESCRIPTION OF THE INVENTION

With the aid of FIG. 1, a first very simple embodiment of an energy recovering system according to the invention is displayed which energy recovering system will be designated as a whole in the following by reference sign 1.

Figure 1:
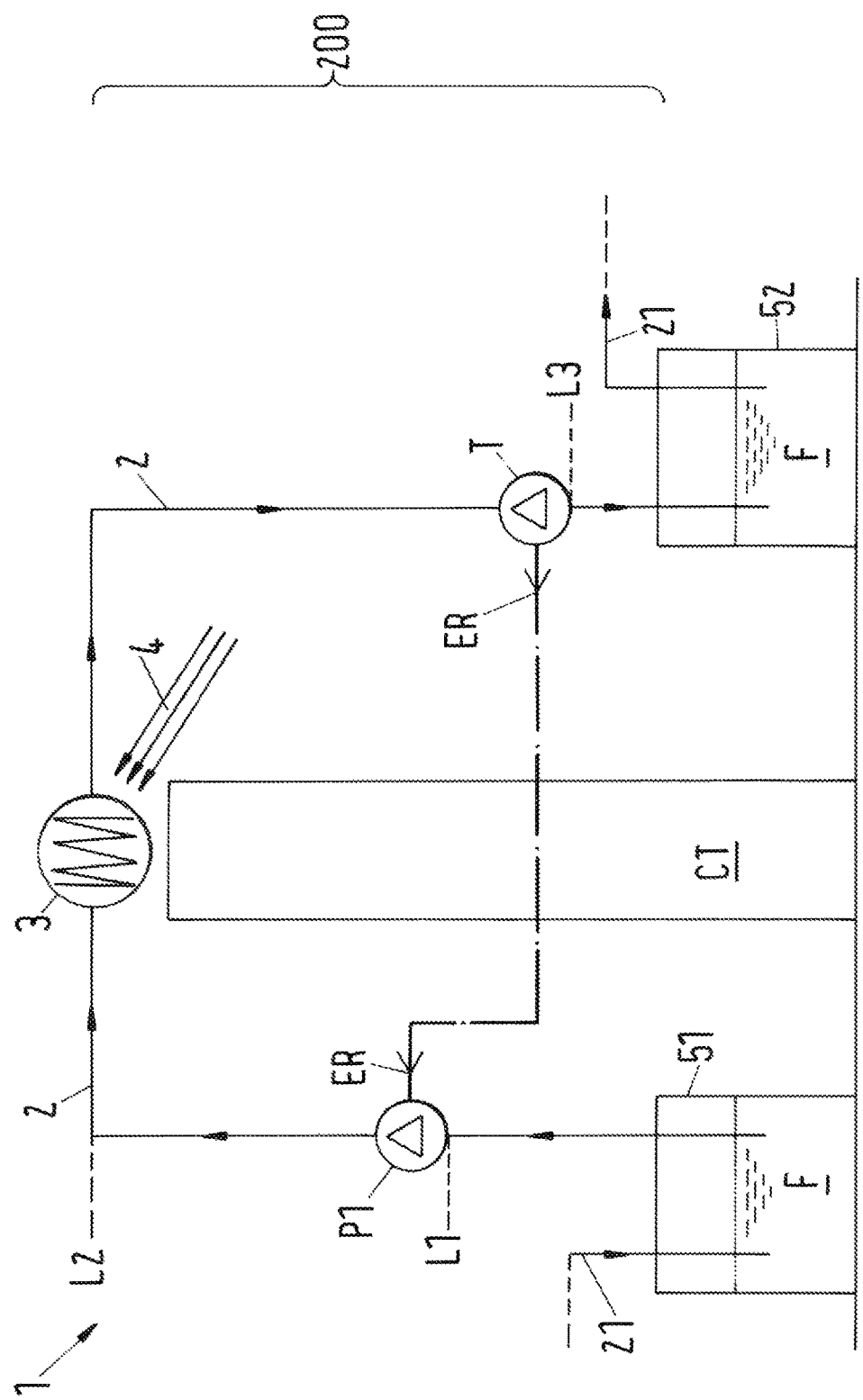
FIG. 1 is a first simple embodiment of an energy recovering system according to the invention.

The very simple embodiment of an energy recovering equipment 1 according to FIG. 1 is comprising a first pump P1 for pumping a fluid F from a first lower level L1 corresponding to a first lower potential energy to a second higher level L2 corresponding to a second higher potential energy. Also comprised is a turbine T being located at a third level L3 corresponding to a third potential energy being smaller than said second higher potential energy, wherein the turbine T is fluidly connected to the first pump P1 by a connecting pipe 2 in such a way that, in the operating state, the fluid F can be fed by the first pump P1 via the connecting pipe 2 from the first lower level L1 and via the second higher level L2 to the turbine T located at the third level L3. It is understood that the turbine T can be located at any level below the second level L2. Regarding the embodiment according to FIG. 1 the turbine T is located on a level L3 being even below the level L1 of pump 1. In another embodiment it is of course also possible that the turbine T is located on a level L3 which is between Level L1 and Level L2. According to the invention, the turbine T is connected to the first pump P1 in such a way that an recovery-energy ER recovered from the fluid F by passing through the turbine T is used for a drive of the concurrently operating first pump P1.

In order to increase a thermal energy of the fluid F by heating it up with the help of the external energy source 4, which is here the sunlight provided by not explicitly shown heliostats, the first pump P1 and the turbine T are fluidly connected via an energy exchange device 3 being provided at the second higher level L2 onto the central tower CT to enable the fluid F to gather light energy from the external energy source 4.

In order to properly store the cold Fluid F, which is in the present example a molten salt, a first storage tank 51 is provide and for storing the hot molten salt heated up by means of the energy exchange device 3, a second storage tank 52 for the fluid F is also provided.

Figure 2:
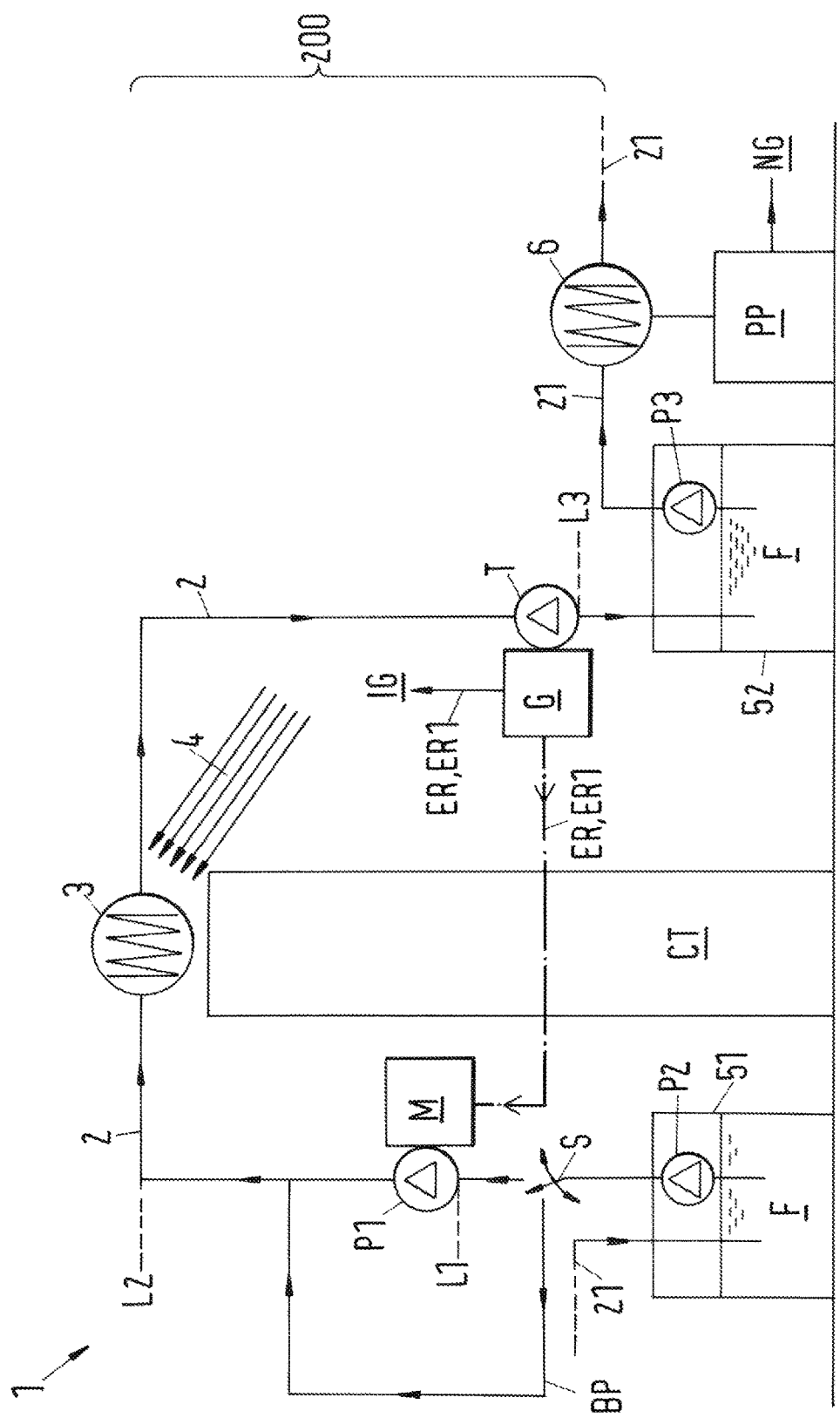
FIG. 2 is a second embodiment, wherein the turbine is electrically connected to the first pump.
Figure 3:
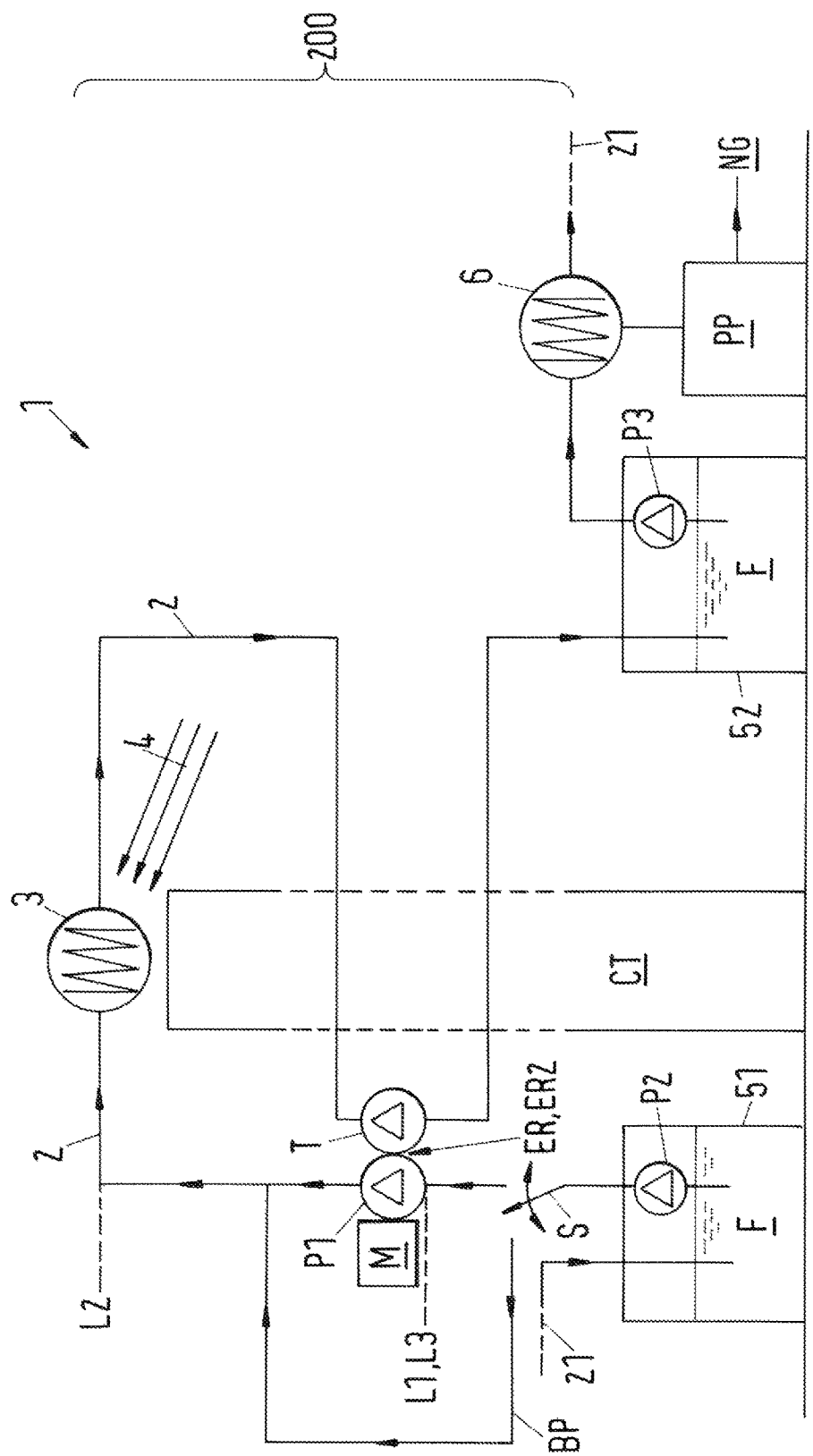
FIG. 3 is a third embodiment, wherein the turbine is mechanically connected to the first pump.

Since the energy recovering equipment 1 in accordance with FIG. 1 is intended to be used in a power plant producing some kind of useful energy, an energy transforming system 6 is provided in such a way that the fluid F can be fed by the first pump P1 located on the first lower level L1, via the connecting line 2, via the second higher level L2, in particular via the energy exchange device 3 being provided at the second higher level L2 onto the central tower CT, and the turbine T to the energy transforming system 6. That is, a closed recirculation cycle 200 is established for circulating the fluid F. The energy transforming system 6 is for example a heat exchanger 6 being coupled to an electric power plant PP for producing and feeding electric energy into an electrical national grid NG, as shown in FIG. 2 and FIG. 3. Or the energy transforming system 6 is for example a heat exchanger 6 being coupled to a long-distance heating power plant PP for producing and feeding heat energy into a public or local heating national grid NG.

As schematically displayed in FIG. 1, the turbine T is energetically coupled to the first pump P1 in order to feed the recovered recovery-energy ER from the turbine T to the first pump P1. In this connection, the turbine T may drive an electrical generator G for producing the electrical recovery-energy ER, ER1 being used for the drive of the concurrently operating first pump P1, as for example shown in FIG. 2. Or, regarding for example an embodiment similar to FIG. 3, the turbine T can mechanically, magnetically, or in any other suited manner be coupled to the first pump P1 providing the mechanical recovery-energy ER, ER2 used for the drive of the concurrently operating first pump P1.

With the aid of FIG. 2 a second embodiment is discussed, showing an example with the turbine T being electrically connected to the first pump 1. And with the aid of FIG. 3 a third embodiment is shown which is essentially identical to the embodiment according to FIG. 2 except from that the turbine T is mechanically connected to the first pump 1, that is, in the special embodiment of FIG. 3, the rotor of the turbine T and the pump-rotor of the first pump P1 are coupled together being mounted onto the same axis of rotation.

Regarding FIG. 2, the turbine T drives an electrical generator G producing the electrical recovery-energy ER, ER1 which in the example of FIG. 2 also be used for an internal electrical grid IG energizing further electrical components of the energy recovering system 1, in addition to energizing the drive of the first pump 1.

The energy recovering equipment 1 according to FIG. 2 or FIG. 3, respectively, establish the recirculation cycle 200 comprising the first storage tank 51, the second storage tank 52, the return pipe 21 and the energy transforming system 6 in such a way that the fluid F can be fed in the operation state by the first pump P1 located on the first lower level L1 from the first storage tank (51), via the connecting line 2, via the second higher level L2, that means via the energy exchange device 3 being provided at the second higher level L2 onto the central tower CT, and the turbine T to the second storage tank 52 and via the energy transforming system 6 being connected to the return pipe 21 back to the first storage tank 41.

In addition, there is a second pump P2 provided, which is in particular located in the first storage tank 51 and connected in series to the first pump P1 supporting pump P1 in pumping the fluid F from the first storage tank up to the energy exchange device 3 on the central tower CT.

Regarding the embodiments shown in FIG. 2 and FIG. 3, respectively, advantageously a by-pass pipe BP is provided for by-passing the pump P1 in order to ensure that the pumping process will start-up properly. For starting up the pumping process, the switch S connects the pump P2 with the by-pass pipe BP. When the pumping process has been started up, the pump P2 will be connected by switch S with pump p1 and, as a result, pump p1 driven by turbine T will assist pump 2.

In order to support the feeding of the fluid F to the energy transforming system 6, a third pump P3 is preferably provided as shown by FIG. 2 and FIG. 3, which third pump P3 is particularly advantageous located in the second storage tank 52.

In order to ensure that the energy recovering system 1 can be operated even if the turbine 1 is out of operation, for what case ever, a by-pass-connection pipe can also be provided bypassing the turbine T. The by-pass-connection pipe, which is not explicitly shown in the figures, are provided with respective check-valves in such a way, that the fluid can be fed through the by-pass-connection pipe instead through the turbine T in case that the turbine 1 is out of operation.

Regarding a special embodiment of the energy recovering equipment 1 according to FIG. 3, a 110 MW Central Tower CT is used. The highest point of the solar receiver which is essentially equivalent to the second higher level 2 at the top of the tower CT is located at approximately 195 m from the floor level (static head).

Regarding an assumed physical height of the energy exchange device 3 of about 195 m on the central tower CT, the TDH (Total Discharge Height) at the rated point is 325 m, thus, meaning 130 m friction losses at duty (dynamic head) in the ascending part of the connecting pipe 2 from the Cold Salt Tank, which is the first storage tank 51, and to the receiver tubes of the energy exchange device 3. It is further assumed that the friction losses in the descending part of the connecting pipe 2 pipe to the Hot Salt Tank, which is the second storage tank 52, are equivalent to 30 m and that a back pressure of equivalent to 10 m is left in the salts prior to enter in the tanks to avoid flashing.

Thus, according to the data given in the TDS of the Cold Molten Salt Pumps, if we introduce an Energy Recovery Booster Device, which is the combination of turbine T and first pump P1, in the process, the balance of the pumpage would be the following, which turned out to work:

|  | Vertical Multistage Pump P2 3 × 33% | Pump P1 side of Booster Single Stage 3 × 33% | Turbine T side of Booster Single Stage 3 × 33% |
| --- | --- | --- | --- |
| Rated flow (m3/h) | 929 | 929 | 929 |
| Rated TDH (m) | 227 | 98 | 155 |
| Temperature (° C.) | 288 | 288 | 566 |
| Specific gravity | 1.902 | 1.902 | 1.726 |
| Efficiency (%) | 81 | 83 | 85 |
| Power input/output (kW) | 1,350 | 570 | 570 |
| Power balance (kW) |  | 3 × 1,350 |  |
| Speed (rpm) | ~1200 | ~3000 | ~3000 |

The vertical multistage pump, which is the second pump P2 could easily reach the highest part of the receiver 3 (>195 m) on the central tower CT and start the process at low flows. Once the process has been initiated, the Booster first pump P1 will start to recover energy and will help pumping in series with the vertical second pump P2 until reaching the rated condition. The total power saved at the rated condition will be approximately 3×570 kW=1,710 kW what means 30% of the consumption of the Cold Salt Pumps, which is the second pump P2. That is, more than 1.5% of the power plant output is saved by using the present invention in this special embodiment.

It is understood that all the embodiments of the invention described above are only to be understood as examples and the invention includes in particular, but not only, all suitable combinations of the embodiments described.

The invention claimed is:

1. An energy recovering equipment, comprising:
a first pump for pumping a liquid from a first lower level corresponding to a first lower potential energy to a second higher level corresponding to a second higher potential energy,
a turbine being located at a third level corresponding to a third potential energy being smaller than said second higher potential energy, and
a first tank and a second tank for storing the liquid, wherein the first lower level and the third level are above the first tank and the second tank,
wherein the turbine is in liquid communication with the first pump by a connecting pipe in such a way that, in an operating state, the liquid is fed by the first pump via the connecting pipe from the first lower level and via the second higher level to the turbine located at the third level, wherein the turbine is connected to the first pump in such a way that a recovery-energy recovered from the liquid by passing through the turbine is used to drive the first pump that operates concurrently with the turbine, wherein the first pump and the turbine are in liquid communication via an energy exchange device being provided at the second higher level for exchanging energy between the liquid and an external energy.

2. The energy recovering equipment in accordance with claim 1, wherein the energy exchange device is provided at the second higher level for increasing a thermal energy of the liquid.

3. The energy recovering equipment in accordance with claim 1, wherein an energy transforming system is provided in such a way that the liquid is fed by the first pump located on the first lower level, via the connecting pipe, via the second higher level.

4. The energy recovering system in accordance with claim 3, wherein the energy transforming system is an heat exchanger being coupled to an electric power plant for producing and feeding electric energy into an electrical national grid.

5. The energy recovering system in accordance with claim 3, wherein the energy transforming system is an heat exchanger being coupled to a long-distance heating power plant for producing and feeding heat energy into an heating national grid.

6. The energy recovering equipment in accordance with claim 3, wherein the liquid is fed by the first pump via the energy exchange device being provided at the second higher level, and the turbine to the energy transforming system.

7. The energy recovering equipment in accordance with claim 1, wherein a recirculation cycle comprising a return pipe is provided in such a way that the liquid is fed by the first pump located on the first lower level from the first tank, via the connecting pipe, via the second higher level.

8. The energy recovering equipment in accordance with claim 7, wherein the recirculation cycle comprises the first tank, the second tank, the return pipe and the energy transforming system in such a way that the liquid is fed by the first pump located on the first lower level from the first tank, via the connecting pipe, via the second higher level.

9. The energy recovering equipment in accordance with claim 8, wherein the liquid is fed by the first pump from the first tank via the energy exchange device being provided at the second higher level, and the turbine to the second tank and via the energy transforming system being connected to the return pipe back to the first tank.

10. The energy recovering equipment in accordance with claim 7, wherein the liquid is fed by the first pump from the first tank via the energy exchange device being provided at the second higher level, and the turbine back to the first pump.

11. The energy recovering equipment in accordance with claim 1, wherein a second pump is provided.

12. The energy recovering equipment in accordance with claim 11, wherein the second pump is located in the first tank.

13. The energy recovering equipment in accordance with claim 12, wherein the second pump is connected in series to the first pump.

14. The energy recovering equipment in accordance with claim 1, wherein a third pump is provided.

15. The energy recovering equipment in accordance with claim 14, wherein the third pump is located in the second tank.

16. The energy recovering equipment in accordance with claim 15, wherein the third pump is connected to and for feeding the liquid to the energy transforming system.

17. The energy recovering equipment in accordance with claim 1, wherein the turbine drives an electrical generator producing the recovery-energy being used to drive the concurrently operating first pump.

18. The energy recovering equipment in accordance with claim 1, wherein the turbine drives an electrical generator producing the recovery-energy being used for an internal grid.

19. The energy recovering equipment in accordance with claim 1, wherein the turbine is mechanically or magnetically coupled to the first pump providing the recovery-energy used to drive of the concurrently operating first pump.

20. The energy recovering equipment in accordance with claim 1, wherein an output pump-power of the first pump is essentially equal or greater than an output turbine-power of the turbine.

21. The energy recovering equipment in accordance with claim 1, further comprising:
   a by-pass-connection pipe provided for bypassing the turbine, wherein the liquid is fed through the by-pass-connection pipe instead through the turbine when the turbine is out of operation.

22. The energy recovering equipment in accordance with claim 1, wherein the turbine is electrically connected to the first pump.

23. The energy recovering equipment in accordance with claim 1, wherein the third level is equal to or lower than the first lower level.

24. A method for recovering a recovery-energy by means of an energy recovering equipment, the method comprising: providing a first pump for pumping a liquid from a first lower level corresponding to a first lower potential energy to a second higher level corresponding to a second higher potential energy, a turbine being located at a third level corresponding to a third potential energy being smaller than said second higher potential energy, and a first tank and a second tank for storing the liquid, wherein the first lower level and the third level are above the first tank and the second tank, wherein the turbine is in liquid communication with the first pump by a connecting line and the liquid is fed by the first pump via the connecting line from the first lower level and via the second higher level to the turbine located at the third level, wherein the turbine is connected to the first pump in such a way that the recovery-energy recovered from the liquid by passing through the turbine is used to drive the first pump that operates concurrently with the turbine, wherein the first pump and the turbine are in liquid communication via an energy exchange device being provided at the second higher level for exchanging energy between the liquid and an external energy.

* * * * *